Aug. 19, 1958  W. C. ALBERTSON, JR  2,847,760
GRASS SHEARS
Filed Feb. 11, 1957  3 Sheets-Sheet 1
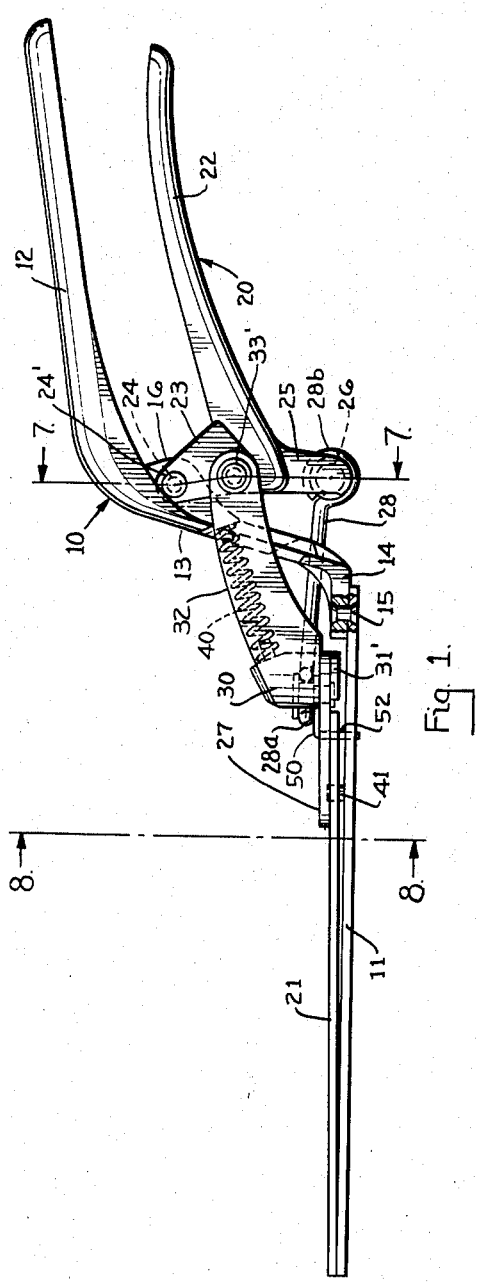
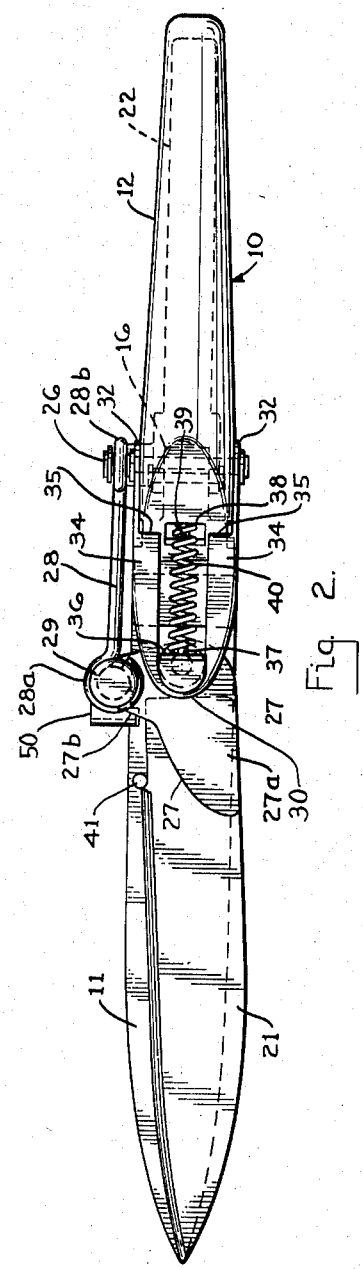
INVENTOR.
William C. Albertson, Jr.
BY
ATTORNEYS.

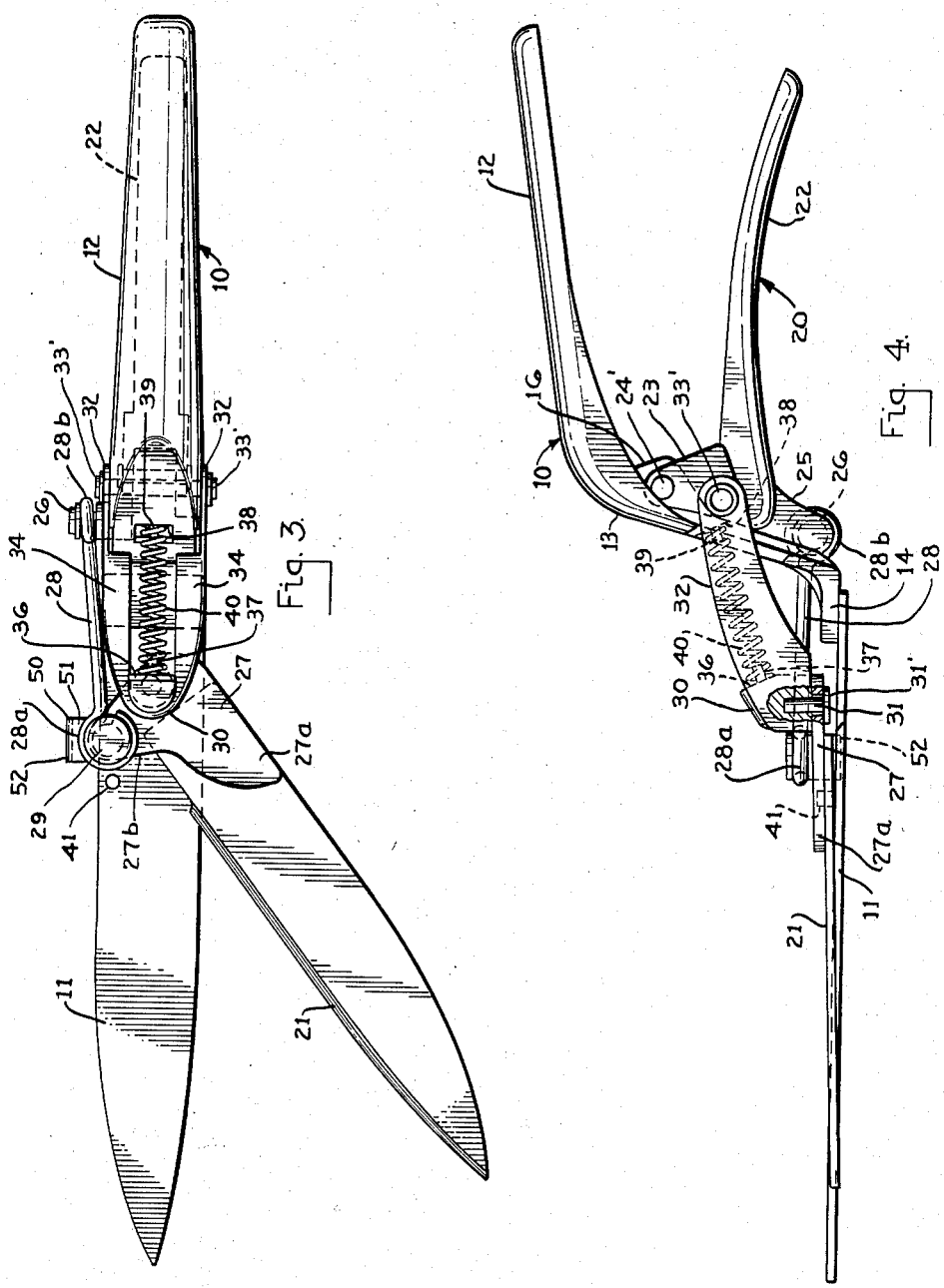

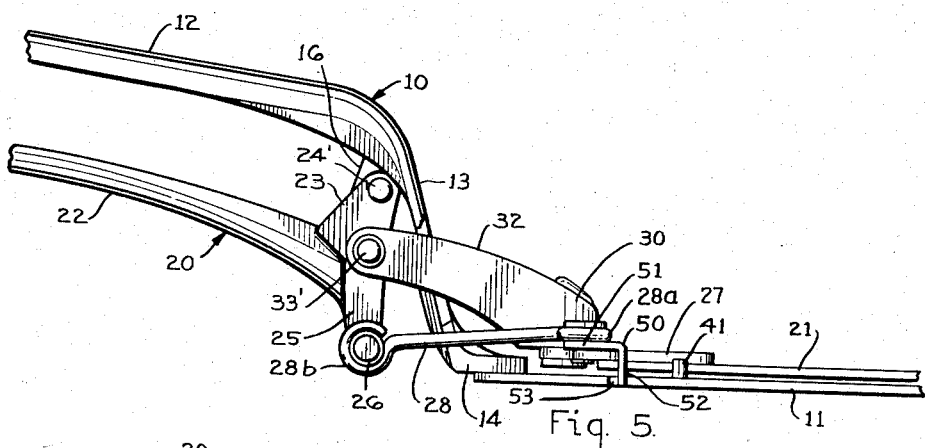
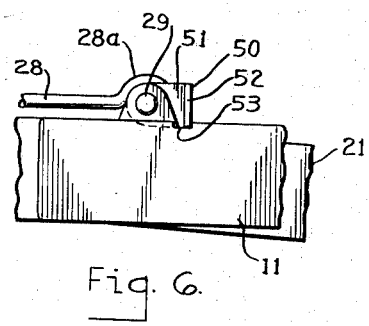
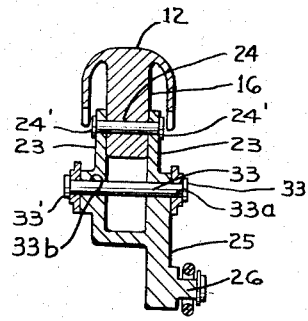
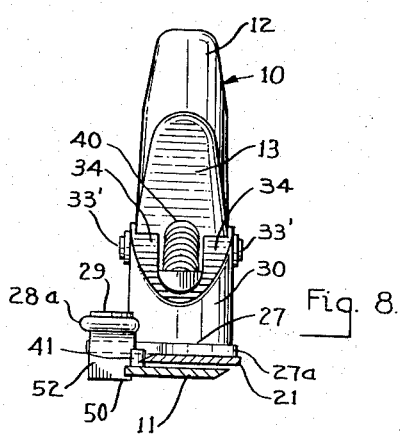

United States Patent Office 2,847,760
Patented Aug. 19, 1958

2,847,760
GRASS SHEARS

William C. Albertson, Jr., Lakewood, Ohio, assignor to True Temper Corporation, Cleveland, Ohio, a corporation of Ohio Application February 11, 1957, Serial No. 639,303

13 Claims. (Cl. 30—238)

My invention relates to shearing devices and relates more particularly to means for improving the cutting action of a pivoted blade which is movable relative to a fixed blade in a pair of shears.

One object of my invention is to provide a blade actuating mechanism, which is compact and attractive in appearance.

Another object of my invention is to provide a pair of shears of the above type which may be operated with a minimum of manual effort on the part of the operator.

Still another object of my invention is to provide an improved blade actuating mechanism which comprises a minimum of mechanical parts.

Yet another object of my invention is to provide a pair of shears of the above mentioned type in which the movable blade is pivotally free of the fixed blade.

A still further object of my invention is to provide a pair of shears wherein the movable blade is manually held against the fixed blade in a positive manner during the cutting action thereof.

An additional object of my invention is to provide, in a shear of the type referred to, improved action and greater efficiency.

Further objects of my invention and the invention itself will become evident by a study of the ensuing written disclosure and the appended drawings in which:

Fig. 1 is a side elevational view of a pair of shears, said shears being shown in a closed position;

Fig. 2 is a top plan view of the shears of Fig. 1;

Fig. 3 is a top plan view of the shears of Fig. 1, said shears being shown in an open position;

Fig. 4 is a side plan view of the shears in the open position as shown in Fig. 3;

Fig. 5 is a side plan view of a portion of the shears as shown in Fig. 1, said plan view being taken from the opposite side from that shown in Fig. 1;

Fig. 6 is a bottom plan view of a portion of the shears as shown in Fig. 1 showing a locking device on said shears;

Fig. 7 is a vertical sectional view taken along the line 7—7 of Fig. 1; and

Fig. 8 is a vertical sectional view taken along the line 8—8 of Fig. 1.

Referring now to the drawings in all of which like parts are designated by like reference characters, the shears of my invention comprise a fixed blade assembly 10 and a movable blade assembly 20.

The fixed blade assembly 10 comprises a forwardly disposed fixed blade 11 and a relatively rearwardly disposed upper handle 12, as illustrated in Figs. 1, 4 and 5. The upper handle 12 is provided at the forward end thereof with a downwardly and preferably slightly forwardly projecting handle extension 13, said extension having a horizontally disposed, forwardly directed foot portion 14 adjacent its lower end. The fixed blade 11 is rigidly attached to the lower surface of the foot portion 14 of the upper handle 12 preferably by rivets 15 or other suitable means.

The movable blade assembly 20 comprises a forwardly disposed movable blade 21 and a rearwardly disposed lower handle 22, as illustrated in Figs. 1, 4 and 5. The lower handle 22 is pivotally mounted upon a rearwardly projecting journal portion 16 of the upper handle extension 13, said lower handle having a pair of upwardly extending, laterally interspaced arms 23 at the forward end thereof, said journal portion of the upper handle extension 13 being interposed between said arms. A transverse shaft or pin 24 extends through suitable apertures in the arms 23 of the handle 22 and the journal portion 16 of the handle extension 13, said shaft having heads 24' on either end thereof.

The lower handle 22 is also provided with a preferably laterally disposed, downwardly extending lever arm 25 at the forward end thereof, said lever arm having a laterally projecting stud 26 at its lower end portion. In the form shown, the arms 23 and the lever arm 25 are preferably integrally formed with the lower handle 22 and adapted for movement therewith.

The movable blade 21 is positioned above the fixed blade 11 and in the form shown said movable blade is attached by riveting or other suitable means to an arm 27a of a blade extension 27. The blade extension 27 is substantially bell crank shaped (Figs. 2 and 3) having the recited arm 27a and a free arm 27b. The blade extension arm 27b projects laterally in the same direction as the stud 26 of the lever arm 25 of the lower handle 22, said blade extension arm and stud extending laterally outwardly from the blades. A link 28 connects the end of the blade extension arm 27a to the stud 26, said link being preferably formed of heavy gage wire and preferably having a loop portion 28a at the forward end thereof and a loop portion 28b at the rearward end thereof. The loop portion 28a, as shown herein, is pivotally mounted upon a vertically upwardly disposed blade extension pivot stud 29 of the blade extension arm 27b and the loop portion 28b is pivotally mounted upon the axially horizontally disposed stud 26 of the lever arm 25.

The movable blade 21 is mounted for pivotal movement about a pivot pin 31 projecting downwardly from the lower surface of a blade support 30. Said pivot pin 31 is provided with a downwardly disposed head 31' and is driven into or otherwise suitably attached to said blade support.

The blade support 30 has a pair of laterally interspaced, rearwardly and preferably flat slightly upwardly extending arms 32, said arms being so spaced and of such dimension as to extend rearwardly on either side of the handle extension 13 of the upper handle 12. The arms 32 of the blade support 30 are pivotally mounted to the forwardly disposed end of the lower handle 22 by means of a transverse shaft 33, said shaft being disposed through suitable aligned apertures 33a in said arms 32 and apertures 33b in said lower handle, said shaft 33 being provided with heads 33' swaged on either end thereof. The pivot shaft 33 is vertically intermediately disposed between the pin 24 of the journal portion 16 and the stud 26 of the lever arm 25.

The opposite generally parallel arms 32 of the blade support 30 are preferably provided with inwardly projecting flanges 34 (Figs. 2 and 3) at the upper edges thereof, said flanges having rearwardly disposed edge portions 35. The edge portions 35 of the flanges 34 are so disposed as to contact the forward surface of the upper handle extension 13 when the shears of my invention are in the closed position, as shown in Figs. 1 and 2.

Intermediate the arms 32 of the blade support 30, said blade support is provided with a rearwardly and preferably slightly upwardly directed seat portion 36 having a centering stud 37 projecting rearwardly and slightly upwardly therefrom. The handle extension 13 of the upper handle 12 is provided with a forwardly and slightly downwardly directed seat portion 38 having a forwardly and slightly downwardly projecting centering stud 39. A coil spring 40 is resiliently positioned between the seat portion 36 of the blade support 30 and the seat portion 38 of the handle extension 13, the forward and rearward ends of said spring being centered against lateral displacement upon the centering studs 37 and 39 respectively.

The fixed blade 11 is preferably provided with a vertically upwardly projecting stop 41 near the rearward portion thereof, said stop being so disposed as to abut a rearward portion of the movable blade 21 when the shears of my invention are in a closed position, as best shown in Fig. 2.

From the above description it will be understood that the shears of my invention operate in the following manner:

The lower handle 22 pivots upon a transverse horizontal axis relative to the upper handle 12 by means of the relatively upwardly disposed pivot pin 24 in the journal portion 16 of the upper handle extension 13. The pivotal motion of the lower handle 22 is converted into a longitudinally reciprocating motion in the blade support 30 by means of the arms 32 pivoted at their rearward ends upon the transverse horizontal axis of the relatively medially disposed pivot pin 33 in the lower handle 22. The link 28 between the lever arms 25 and the blade extension arm 27b of the movable blade 21 is also caused to reciprocatively move, such motion being converted to axially vertical pivotal motion in the movable blade 21 by means of the arm 27b of the blade extension 27 and the axially vertically disposed pivot pin 31 of the blade support 30. It will be noted that the radial distance between the pivot pin 24 and the stud 26 is substantially greater than the radial distance between said pivot pin 24 and the relatively medially disposed pivot pin 33 thereby effecting relatively greater longitudinal reciprocal motion in the link 28 than in the blade support 30 (Figs. 1 and 4).

The shears of my invention are biased in an open position (Fig. 3) by the spring 40 which is resiliently compressed between the seat portion 36 of the blade support 30 and the seat portion 38 of the upper handle extension 13. As the blade support 30 is biased forwardly relative to the upper handle 12, the lower handle 22 is pivoted in a downward direction around the pin 24 and the blade 21 is pivoted away from the blade 11 by means of the link 28 to an open or non-cutting position.

When the lower handle 22 is moved upwardly by the operator the movable blade 21 is pulled rearwardly by the blade support 30 and also pivoted inwardly toward the fixed blade 11 by the link 28 thus effecting a simultaneous rearward and pivotally inward compound motion. The link 28 is pivotally mounted upon the blade extension arm 27b and the lever arm 25 in a plane substantially lower than the pivot pin 33 of the blade carrier 30 thus depressing the movable blade 21 downwardly upon the fixed blade 11 during the cutting motion of said blades.

During the cutting motion of my shears, therefore, the movable blade 21 pivots inwardly toward the fixed blade 11, moves rearwardly toward the handles, and is manually firmly held against said fixed blade to insure efficient cutting.

The relative location of the fixed blade 11 and the movable blade 21 when the shears are in a closed position is restrained by said movable blade abutting the stop 41 of said fixed blade. The limit to which the lower handle 22 can be pivoted upwardly toward the fixed handle 12 is determined by the rearwardly disposed edge portions 35 of the flanges 34 on the blade support arms 32, said edge portions abutting the forward surface of the upper handle extension 13.

Although the shears of my invention are normally biased in an open position when not in use (Fig. 3), I provide locking means whereby said shears may be held in a closed position for purposes of convenience, such as in storing said shears.

The lock 50 is pivotally mounted upon the blade extension pivot stud 29 of the blade extension 27. The lock 50 comprises a horizontally disposed, suitably apertured, pivot plate 51 and a right angularly disposed and downwardly directed latch 52. The fixed blade 11 is provided with a preferably rectangular notch 53 in the outer or noncutting edge thereof, said notch being so positioned as to be adjacent the downwardly projecting latch 52 when the shears are in a closed position. By pivoting the latch 52 into the notch 53 the movable blade 21 and the blade support 30 are locked against forward movement, thereby holding the shears in a closed position.

It will be understood that many departures from the details of my invention as it is herein described and illustrated may be made, such as in size and dimension, without, however, departing from the spirit of my invention or the scope of the appended claims.

What I claim is:

1. A pair of shears comprising a fixed blade, a movable blade, a fixed handle rigidly secured to said fixed blade, a blade support, said movable blade pivotally mounted upon said blade support, a movable handle, said blade support pivotally mounted upon said movable handle, said movable handle pivotally mounted upon said fixed handle.

2. A pair of shears comprising a fixed blade, a first handle rigidly secured to said fixed blade, a movable blade, a blade support, said movable blade pivotally mounted upon said blade support for movement in a horizontal plane, a second handle, said blade support mounted upon said second handle for movement in a vertical plane, said second handle pivotally mounted upon said first handle.

3. A pair of shears comprising a fixed blade, a movable blade, a fixed handle rigidly secured to said fixed blade, a blade support, said movable blade pivotally mounted upon said blade support, a movable handle, said blade support pivotally mounted upon said movable handle, a spring compressively positioned between said blade support and said fixed handle, said movable handle pivotally mounted upon said fixed handle.

4. A pair of shears comprising a fixed blade, a movable blade, a fixed handle rigidly secured to said fixed blade, a blade support, said movable blade pivotally mounted upon said blade support, a movable handle, said blade support pivotally mounted upon said movable handle, spring means resiliently urging said blade support away from said fixed handle, pivot means pivoting said movable handle relative to said fixed handle.

5. A pair of shears comprising a fixed blade, a movable blade, a fixed handle rigidly secured to said fixed blade, a blade support, said movable blade pivotally mounted upon said blade support for movement in a horizontal plane, a movable handle, said blade support pivotally mounted upon said movable handle for movement in a vertical plane relative to said movable handle, a spring compressively positioned between said blade support and said fixed handle, said movable handle pivotally mounted upon said fixed handle for movement in a vertical plane.

6. A pair of shears substantially as set forth in claim 4 characterized by the recited movable blade having a blade extension, said movable handle having a lever portion, a link pivotally connected to said blade extension and said lever portion to effect responsive movement therebetween.

7. A pair of shears comprising a fixed blade, a movable blade, a fixed handle rigidly secured to said fixed blade, a blade support, said movable blade pivotally mounted upon said blade support for movement in a horizontal plane, a movable handle, said blade support pivotally mounted upon said movable handle for movement in a vertical plane relative thereto, said movable blade having a blade extension, said movable handle having a lever portion, a link pivotally connected to said blade extension and said lever portion to effect responsive movement therebetween, said movable handle pivotally mounted upon said fixed handle for movement in a vertical plane.

8. A pair of shears comprising an upper handle and a lower handle, said upper handle having a downwardly extending upper handle extension, a fixed blade rigidly secured to said upper handle extension adjacent the lowermost end thereof, said lower handle pivotally mounted upon said upper handle extension, a movable blade pivotally mounted upon a blade support, said blade support pivotally mounted upon said lower handle, said movable blade having a blade extension, a link pivotally mounted upon said blade extension at one end thereof, said lower handle having a downwardly projecting lever arm, said link pivotally mounted upon said lever arm at the other end thereof, a spring resiliently positioned between said blade support and said upper handle extension, said spring biasing said blade support away from said upper handle extension.

9. A pair of shears comprising an upper handle and a lower handle, said upper handle having a downwardly extending upper handle extension, a fixed blade rigidly secured to said upper handle extension adjacent the lowermost end thereof, said lower handle pivotally mounted upon said upper handle extension, a movable blade pivotally mounted upon a blade support, said blade support pivotally mounted upon said lower handle, said movable blade having a blade extension, a link pivotally mounted upon said blade extension at one end thereof, said lower handle having a downwardly projecting lever arm, said link pivotally mounted upon said lever arm at the other end thereof.

10. A pair of shears comprising an upper handle and a lower handle, said upper handle having a substantially downwardly extending upper handle extension, a fixed blade rigidly secured to said upper handle extension adjacent the lowermost end thereof, said lower handle having upwardly extending arm portions and a downwardly extending lever arm adjacent one end thereof, said upper handle extension having a journal portion thereon, said arm portions of said lower handle pivotally mounted upon said journal portion, a movable blade pivotally mounted upon a blade support, said blade support having arms pivotally mounted upon said lower handle in a lower plane than that of said journal portion, said movable blade having a laterally projecting blade extension, a link pivotally mounted upon said blade extension at one end thereof, said link pivotally mounted upon said lever arm at the other end of said link, a spring resiliently positioned between said blade support and said upper handle extension, said spring biasing said blade support away from said upper handle extension.

11. A pair of shears comprising a rearwardly disposed upper handle and a rearwardly disposed lower handle, said upper handle having a substantially downwardly projecting upper handle extension at the forward end thereof, a forwardly disposed fixed blade rigidly secured to said upper handle extension, said upper handle extension having a rearwardly directed journal portion, said lower handle having upwardly projecting arms and a downwardly projecting lever arm adjacent the forward end thereof, said upwardly projecting arms providing an upper pivot, said lever arm providing a lower pivot, a medial pivot vertically positioned between said upper pivot and said lower pivot adjacent the forward end of said lower handle, the axes of said upper, medial, and lower pivots being laterally horizontal, said upper pivot mounted upon said journal portion, a forwardly disposed movable blade pivotally mounted upon a blade support for movement in a horizontal plane, said blade support being forwardly disposed relative to said upper handle extension and having blade support arms extending rearwardly on either side of said upper handle extension, said blade support arms pivotally mounted upon said medial pivot of said lower handle, said movable blade having a blade extension adjacent the rearmost end thereof, said blade extension having axially vertical pivot means thereon, a link, said link pivotally mounted upon said pivot means of said blade extension at the forward end of said link, said link pivotally mounted upon said lower pivot of said lower handle at the rearmost end of said link, and a spring longitudinally compressively positioned between said blade support and said upper handle extension.

12. A pair of shears comprising an upper handle and a lower handle, a fixed blade rigidly secured to said upper handle, a blade support, a movable blade pivotally mounted to said blade support and positioned contiguously above said fixed blade, said movable blade having a lateral blade extension, said lower handle having upper, medial, and lower pivots, said lower handle pivotally mounted to said upper handle at said upper pivot of said lower handle for movement in a vertical plane, said blade support mounted upon said medial pivot of said lower handle whereby a vertical pivotal movement of said lower handle effects a longitudinal reciprocating motion in said blade support relative to said fixed blade, a link pivotally connecting said blade extension of said movable blade to said lower pivot of said lower handle whereby said vertical pivotal movement of said lower handle effects a longitudinal reciprocating motion in said link and whereby the longitudinal reciprocating motion of said link is transposed into a horizontal pivotal motion of said movable blade.

13. A pair of shears comprising a fixed handle assembly and a movable handle assembly, said fixed handle assembly having a fixed blade rigidly secured to a fixed handle, said movable handle assembly having a blade support pivotally secured to a movable handle, said movable handle assembly pivotally mounted relative to said fixed handle assembly, a movable blade solely pivotally mounted upon said blade support whereby said movable blade is capable of being vertically spaced from said fixed blade.

References Cited in the file of this patent

UNITED STATES PATENTS 134,922   Moulton  --------------- Jan. 14, 1873